United States Patent [19]
Döbler

[11] Patent Number: 5,520,876
[45] Date of Patent: May 28, 1996

[54] PROCESS AND A DEVICE FOR PRODUCING PLASTIC CUPS BY INJECTION MOULDING

[75] Inventor: Walter Döbler, Urach-Seeburg, Germany

[73] Assignee: Systec Engineering Knauer GmbH & Co. KG, Bad Urach, Germany

[21] Appl. No.: 244,979
[22] PCT Filed: Mar. 18, 1992
[86] PCT No.: PCT/EP92/00594
   § 371 Date: Aug. 15, 1994
   § 102(e) Date: Aug. 15, 1994
[87] PCT Pub. No.: WO93/11923
   PCT Pub. Date: Jun. 24, 1993

[30] Foreign Application Priority Data

Dec. 17, 1991 [DE] Germany ............ 41 41 644.9

[51] Int. Cl.⁶ .............. B29C 45/14; B29C 45/42
[52] U.S. Cl. .............. 264/511; 264/516; 264/334; 425/126.1; 425/444
[58] Field of Search .............. 264/511, 516, 264/247, 272.15, 275, 278, 334; 425/110, 126.1, 126.2, 129.1, 556, 444

[56] References Cited

U.S. PATENT DOCUMENTS

| | | |
|---|---|---|
| 3,869,234 | 3/1975 | Sutch . |
| 4,335,635 | 6/1982 | Hautemont ............ 425/126.1 |
| 4,368,018 | 1/1983 | Rees et al. . |
| 4,865,793 | 9/1989 | Suzuki et al. ............ 425/126.1 |

FOREIGN PATENT DOCUMENTS

| | | |
|---|---|---|
| 0380177 | 8/1990 | European Pat. Off. . |
| 0415153A2 | 3/1991 | European Pat. Off. . |
| 2454970 | 11/1980 | France . |

*Primary Examiner*—Jill L. Heitbrink
*Attorney, Agent, or Firm*—Burns, Doane, Swecker & Mathis

[57] ABSTRACT

A process and a device for injection moulding plastic cups having a label-shaped enveloping sheet integrated therein according to the inmould labelling method and comprising the steps of coaxially moving a male mould and a female mould into one another for establishing thus a closed injection mould and injecting then molten plastic through an opening into said injection mould. During the opening and closing movements of the injection mould, a suction holding mandrel is adapted to be moved to a position at which it extends coaxially with the male mould and the female mould, whereupon the whole female mould is divided into a base member maintaining its instantaneous position and an advancable part, which is moved so as to cover part of the suction holding mandrel for picking up the enveloping sheet and holding it in position by means of a suction force applied through a suction gap and which is then moved back to the base member with which it will recombine so as to establish the complete female mould. Due to the movement of the female mould and the male mould towards each other, the suction holding mandrel is then removed from the interspace by a pivotal movement and the suction gap is closed by means of a force which acts between the female mould and the male mould and which presses these components together.

17 Claims, 6 Drawing Sheets

5,520,876

PROCESS AND A DEVICE FOR PRODUCING PLASTIC CUPS BY INJECTION MOULDING

The present invention refers to an injection moulding process for producing a plastic cup having a label-shaped enveloping sheet integrated in said plastic cup according to the inmould-labelling method, said process comprising the following steps:

picking up an enveloping sheet by means of a suction holding mandrel for inserting said enveloping sheet into a female mould for a subsequent injection moulding process;

opening an injection mould by moving the female mould and a male mould away from each other to an opening position, a controlled positioning arm displacing, in the course of this opening movement, the suction holding mandrel to a position where it extends coaxially with the male mould and the female mould in an interspace evolving between the male mould and the female mould when said male and female moulds are moved apart;

removing the previously produced plastic cup from the male mould;

transferring the enveloping sheet from the suction holding mandrel to the female mould and inserting it therein;

coaxially moving the male mould and the female mould into one another until a closed injection mould is reestablished, the controlled positioning arm removing, due to said closing movement, the suction holding mandrel from the interspace which is defined between the male mould and the female mould and which disappears as a result of said closing movement;

injecting molten plastic into the closed injection mould.

The present invention additionally refers to an injection moulding device used for carrying out the injection moulding process mentioned hereinbefore and comprising a male mould and a female mould which is adapted to be moved coaxially so as to cover the male mould for defining a closed injection mould; an injection nozzle used for injecting molten plastic into the closed injection mould; a positioning arm carrying a suction holding mandrel, said suction holding mandrel being provided with an insertion member which is adapted to insert the enveloping sheet into the female mould, said female mould and said insertion member being each provided with a holding means which is adapted to hold the enveloping sheet in position; a drive means which is adapted to move the male mould and the female mould towards and away from each other; a drive means provided with control means for moving the positioning arm into and out of an interspace by controlled movements, said interspace evolving and disappearing when the female mould and the male mould are moved away from each other and towards each other, respectively.

The inmould-labelling method, which is already known, is used for plastic cups of all kinds, e.g. for yoghurt cups, the enveloping sheet, which is inserted into the injection mould before the molten plastic is filled in, being preferably fabricated from the same plastic material or from a similar plastic material as the molten plastic and fusing during the injection moulding process with the molten plastic injected into the injection mould so that, in the finished plastic cup, the enveloping sheet will form an integral constituent part of the wall of the cup.

The inmould-labelling method has the special advantage that enveloping sheets, which are labels of high printing quality, can be integrated in the plastic cup in a simple manner. When the labels are printed on an otherwise finished plastic cup, it is impossible, not least in view of the three-dimensional configuration of the cup, to realize such a printing quality by means of the printing processes available.

An essential problem arising in connection with the inmould-labelling method is the insertion of an enveloping sheet in the female mould for the subsequent injection moulding process. This insertion process has to be carried out such that, on the one hand, it will consume as little time as possible and that, on the other hand, it is performed with sufficient accuracy so that the enveloping sheet will be inserted into the female mould at the desired position. For this purpose, it is necessary to realize for the injection moulding device a structural design which is as simple as possible and in which correspondingly simple sequences of motions take place so that a troublefree production sequence with a short cycle time can be realized.

EP-A-0 415 153 A2 discloses an insertion device for the enveloping sheet in the case of which a suction holding mandrel enters a female mould together with a previously picked-up enveloping sheet and transfers, by blowing off, the enveloping sheet to the female mould where it is sucked into contact with the female mould by means of vacuum openings and held in position until the male mould is moved into said female mould. PCT/EP 91/00592 additionally describes how the vacuum opening can be constructed in the form of a suction gap.

The structural design according to EP-A-0 415 153 A2, however, entails the drawback that it is comparatively complicated and that the path of movement along which the suction holding mandrel has to be displaced is comparatively complicated.

It is the object of the present invention to provide an injection moulding process and an injection moulding device of the type mentioned at the beginning, which permit a precise and rapid insertion of the enveloping sheet on the basis of a simple structural design with simple sequences of motions.

This object is achieved by means of the injection moulding process according to the present invention having the features that, for inserting the enveloping sheet, at least part of the female mould is advanced coaxially with the suction holding mandrel from the opening position of said female mould towards said suction holding mandrel, that the enveloping sheet is transferred from the suction holding mandrel to the advanced part of the female mould and inserted therein, and that the advanced part of the female mould is returned to the opening position of said female mould.

For carrying out the injection moulding process according to the present invention, an injection moulding device according to the present invention is provided, which has the features that the female mould is adapted to be divided into at least two parts, at least one of said parts being an advancable part which is adapted to be displaced coaxially along a guide means towards the male mould and towards the suction holding mandrel and then back to the opening position of the female mould while the suction holding mandrel remains at the position at which it extends coaxially with the female mould and the male mould.

An essential advantage of the present invention is to be seen in the fact that the path of movement of the suction holding mandrel need not be of such a nature that it will finally lead, like the path of movement according to the prior art, essentially coaxially with an instantaneously stationary female mould into said female mould because, in accordance with the present invention, the advancable part of the female mould is moved towards the suction holding mandrel where it will pick up the enveloping sheet. This is the reason for the fact that the path of movement according to the present invention can be chosen comparatively freely such that it ony leads to a position which is coaxial with the female mould, without leading, however, into said female mould, before the advanced part of the female mould picks up the enveloping sheet from the suction holding mandrel in accordance with the present invention. This will essentially simplify the mechanical structural design of the injection moulding device as well as the sequences of motions carried out during the injection moulding process according to the present invention.

In accordance with an advantageous embodiment of the present invention, the advanced part of the female mould is moved so as to cover at least part of the suction holding mandrel for the purpose of picking up the enveloping sheet. The measure of moving the advanced part of the female mould so as to cover at least part of the suction holding mandrel guarantees a particulary precise transfer of the enveloping sheet from the suction holding mandrel to the female mould.

In accordance with an advantageous further development of the present invention, the enveloping sheet is transferred from the suction holding mandrel to the advanced part of the female mould by blowing said enveloping sheet off the suction holding mandrel, whereupon it is picked up and held in position by said female mould by applying a vacuum to the inner surface of the advanced part of said female mould. The vacuum acting on the inner surface of the advanced part of the female mould is applied in an advantageous manner via a suction gap dividing the advanced part of the female mould into two halves and extending essentially transversely to the direction of movement of the advanced part, said two halves being urged apart by the force of a spring for opening said suction gap when the advanced part of the female mould does not have applied thereto any load, whereas, when the injection mould is closed, said two halves are pressed together against said force of a spring by the application of a closing force to the female mould, whereby the suction gap will be closed again.

The corresponding injection moulding device according to the present invention is provided with an advantageous structural design of such a nature that the advancable part of the female mould is divided into two halves along a suction gap extending essentially transversely to the direction of movement of the female mould, said suction gap having arranged therein a spring element which, when the female mould does not have applied thereto any load, will urge the two halves of the advancable part away from each other, whereby the suction gap will be opened. The spring element consists, in an advantageous manner, of an O-ring accommodated in an adequate annular groove formed in the two halves of the advancable part of the female mould, said annular groove being dimensioned such that there will be room for the O-ring in said annular groove when the injection mould is completely closed and when the two halves are, consequently, fully pressed together.

Although other types of vacuum openings, such as suction holes, may be provided instead of the suction gap, the suction gap serves to realize in a simple manner a suction opening which extends along the whole circumference of the female mould and by means of which the enveloping sheet can, consequently, be reliably sucked into contact with said female mould. Moreover, said suction gap can easily be closed by moving the male mould into the female mould and by subsequently pressing together said male and female moulds. A suction gap has already been described in PCT/EP 91/00592, which was mentioned at the beginning, but this reference does not mention any advancable part of the female mould which is of essential importance with regard to the invention.

Although any spring element produced from an elastic synthetic material or rubber material as well as from metal, such as helical springs, Belleville springs or leaf springs, may be used as a spring element for urging the two halves of the advancable part of the female mould away from each other, it will be particularly advantageous when the spring element is constructed as an O-ring, since such rings are commercially available and guarantee also that the suction gap will be sealingly closed.

In accordance with a particularly advantageous embodiment, the suction holding mandrel is constructed as a combined component and is also used for removing the finished cup, when the suction holding mandrel is located at a position where it extends coaxially with the male mould and the female mould. In accordance with the present invention, this combined component comprises a removal member, which is adapted to remove a plastic cup which has just been produced, and an insertion member, which is adapted to insert the enveloping sheet into the female mould, said removal member and said insertion member being coaxially secured to each other. By means of this advantageous further development of the injection moulding process according to the present invention and of the corresponding injection moulding device, a faster discharge of the plastic cup with simultaneous insertion of the enveloping sheet in the female mould for the subsequent injection moulding process can be achieved. The structural design of the device is simplified, since only one single suction holding mandrel is controlled by the opening and closing movements of the injection mould, i.e. by the movements with which the female mould and the male mould move towards and away from one another; picking up the cup which has just been produced and inserting the enveloping sheet in the female mould simultaneously will also be possible if the area of the opening, i.e. the interspace between the female mould and the male mould, is comparatively small, since there is no necessity of avoiding collisions such as in cases in which separate removal and insertion components are used. Due to said small area of the opening and the resultant short opening movement of the female mould relative to the male mould, accompanied by a combined, simultaneous discharge and insertion, the discharge-insertion process step can be shortened still further and, consequently, the cycle time can be reduced still further.

Moreover, the structural design of the injection moulding device according to the present invention is simplified still further because only one mandrel, viz. the combined component constructed as a removal and insertion mandrels is provided, and this combined component has to be moved into the intermediate gap evolving between the female mould and the male mould by means of only one controlled driving device.

In accordance with an advantageous further development of the above-mentioned suction holding mandrel, which is constructed as a combined component, the holding means for the plastic cup are openings terminating at the surface of the male mould and at the surface of the removal member of the suction holding mandrel, said openings being connected to a vacuum source. By means of the above-mentioned embodiment of the injection moulding device according to the present invention, the plastic cup which has just been produced and which is located on the male mould can, in an advantageous manner, be transferred to the suction holding mandrel, which has been moved to the position at which it extends coaxially with said male mould, by blowing the plastic cup off said male mould towards said suction holding mandrel, and said plastic cup can be picked up by the suction holding mandrel by means of a vacuum applied to a subsection of the surface thereof, said vacuum acting on the bottom of the plastic cup which has just been produced; said plastic cup which has just been produced is, in addition, finally discharged in an advantageous manner from the suction holding mandrel by blowing off at the position of the positioning arm at which said arm has fully been removed from the interspace between the female mould and the male mould. The special advantage in this connection is that holding of the plastic cup by means of a vacuum can easily be realized and temporally controlled. The vacuum openings can simultaneously be used for supplying compressed air so that the cup can be blown off at the desired location. By means of said blowing off, the plastic cup which has just been produced can also be transported a certain distance towards the suction holding mandrel, and this will render superfluous one movement according to which the removal member of the suction holding mandrel would otherwise have to be moved so as to cover the male mould for the purpose of picking up the cup.

In spite of the above-mentioned advantages achieved when the holding means are constructed as vacuum or suction means, it is, however, easily possible to construct said holding means as conventional mechanical tensioning devices; in this case, it would, for example, be possible to provide tensioning elements which are adapted to be moved radially outwards from the male mould and which can be brought into tensioning engagement with the inner wall of the just finished cup like, mentioning an easily understandable example, e.g. the gauging surfaces of an inside micrometer which are moved into contact with the wall of a hole. It is, however, just as well possible to hold the flexible plastic cup by means of tensioning levers applying pressure to said cup from outside or to simply engage an upper edge of the cup, which is located on the female mould, from behind by means of hooks. The holding means of the removal member of the suction holding mandrel can be provided with a corresponding structural design.

In accordance with another advantageous further development of the present invention, the suction holding mandrel is, by means of a forced-control pivotal movement caused by the opening and closing movements, moved to and removed from the position at which it extends coaxially with the male mould and the female mould. The injection moulding device according to the present invention realizes this by means of the features that the positioning arm is a pivotable arm, which is supported such that it is adapted to be pivoted about a swivel axis at one end thereof and which carries the suction holding mandrel at the other, free end thereof. In this connection, it will be advantageous when the drive means provided with the control means for the positioning arm is a cam plate, which is entrained when the male mould and the female mould are moved towards and away from each other and which cooperates with a travelling wheel connected to a rack member which is, in turn, in mesh with a pinion, said pinion being, in turn, rigidly connected to the positioning arm and adapted to be rotated together therewith about the swivel axis of said positioning arm.

Although the cam control means combines the advantage of a rotative drive of the pivotable arm with a control which can be realized easily and at a moderate price, it is also easily possible to provide, instead of a cam control means, a separate drive for the pivotable arm, e.g. in the form of a controlled stepping motor, and to control the pivotal movement e.g. by means of an output signal of a sensor signalling the distance between the male mould and the female mould.

Instead of a pivotable arm, it is just as well possible to provide a telescopic arm for moving the suction holding mandrel into and out of the interspace; also said telescopic arm can be cam-controlled, or it may, for example, be a hydraulic telescopic arm which is controlled by the above-mentioned sensor.

In accordance with another advantageous further development, the male mould is always stationary and the female mould is moved towards and away from said male mould. For this purpose, the male mould is connected to a frame of the injection moulding device in a stationary manner, and the drive means for moving the female mould and the male mould towards and away from each other is constructed in such a way that the female mould can be moved towards the male mould with the aid of said drive means. This has the advantage that only the female mould has to be linearly displaceable along a guide means, and it will thus be possible to reduce the driving and guiding expenditure and to simplify the working process in which the discharge and the insertion are effected simultaneously.

For carrying out the combined discharge-insertion process step, it will suffice to execute only one pivotal movement of the pivotable arm and one linear movement of the whole female mould as well as one linear movement of the advanced part of the female mould towards the suction holding mandrel, which has been pivoted to the position at which it extends coaxially with said female mould, and away from said suction holding mandrel, when the enveloping sheet has been picked up, whereby the number of process steps will be limited to a minimum and the structural design of the injection moulding device will be rendered very simple. Instead of moving only part of the female mould such that it covers the suction holding mandrel for picking up the enveloping sheet, it is also possible to move the whole female mould to this position and to return it from said position.

In the following, the present invention will be explained in detail on the basis of preferred embodiments making reference to the drawing, in which FIG. 1 shows a schematic top view of one embodiment of the injection moulding machine;

Figure 2:
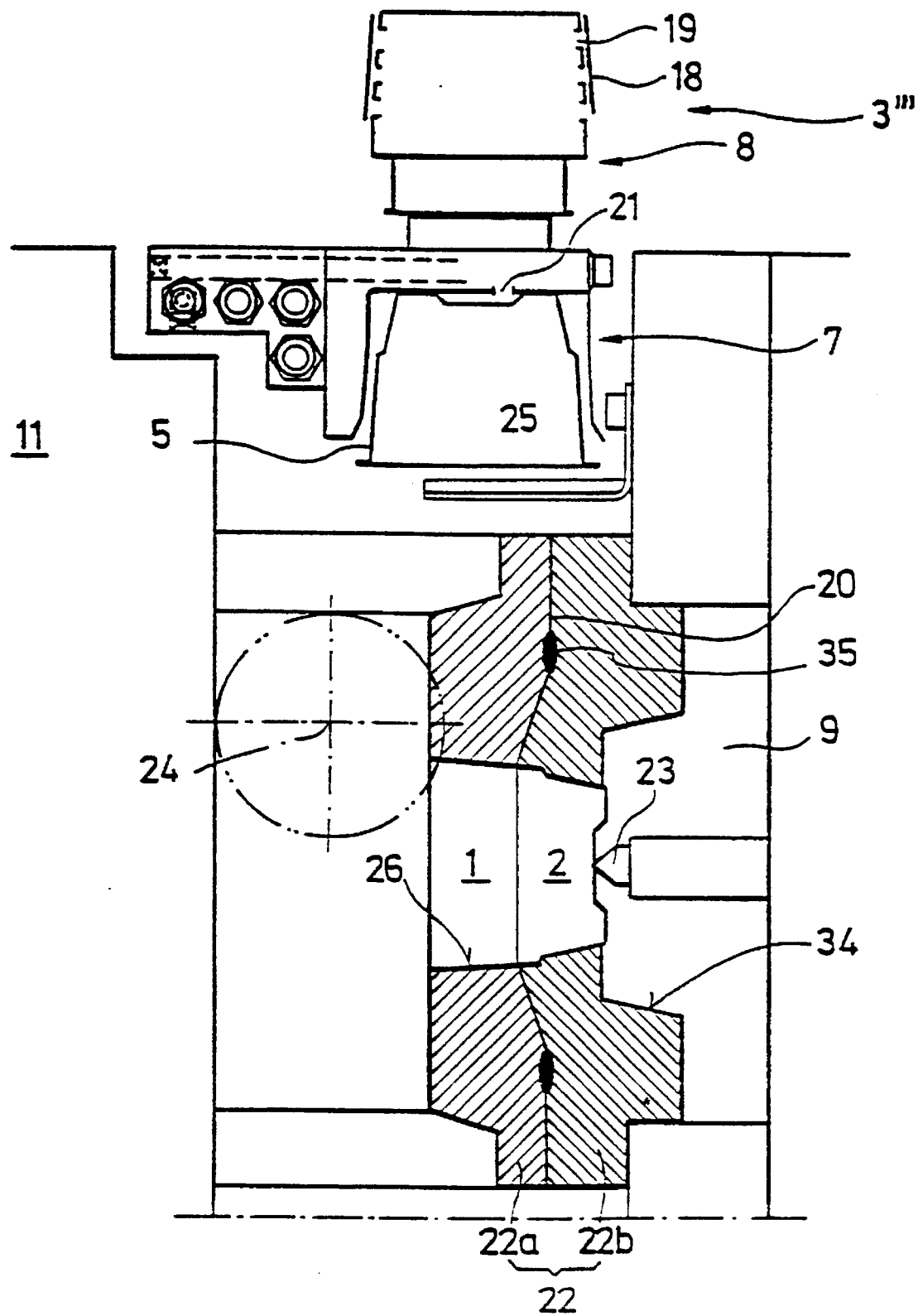
FIG. 2 shows a simplified representation of a fragmentary top view of the injection moulding machine comprising the female mould, the male mould and the suction holding mandrel, in the completely closed condition of the injection mould.
Figure 4:
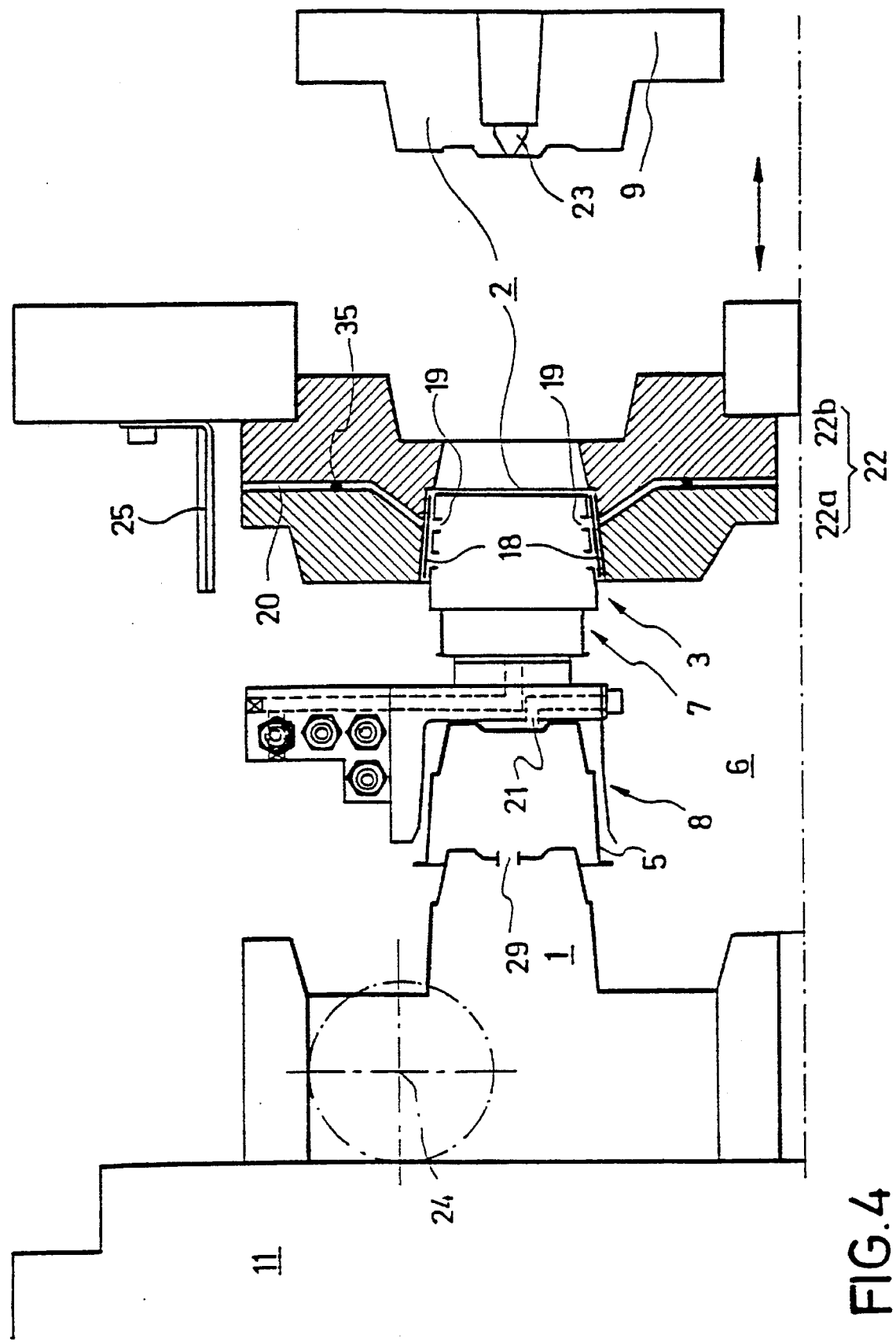
Figure 5:
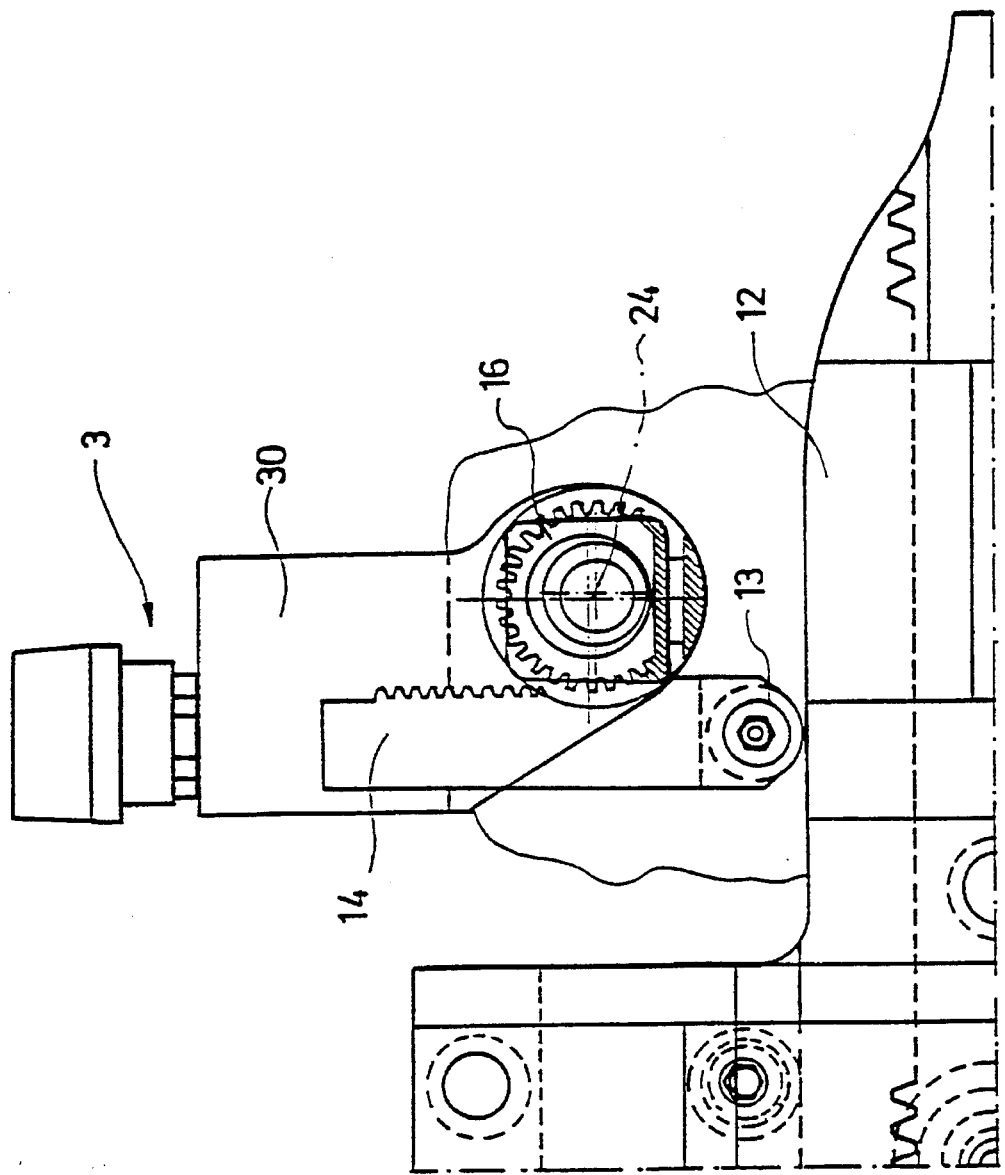

FIG. 4 shows a representation according to FIG. 2 at a position at which the parts of the injection mould have been moved apart completely and at which the suction holding mandrel has, consequently, been pivoted fully into the interspace which has been formed between the female mould and the male mould; the advancable part of the female mould has here been moved such that it covers part of the suction holding mandrel;

FIG. 5 shows a top view of the drive unit for the pivotable arm; and

Figure 6:
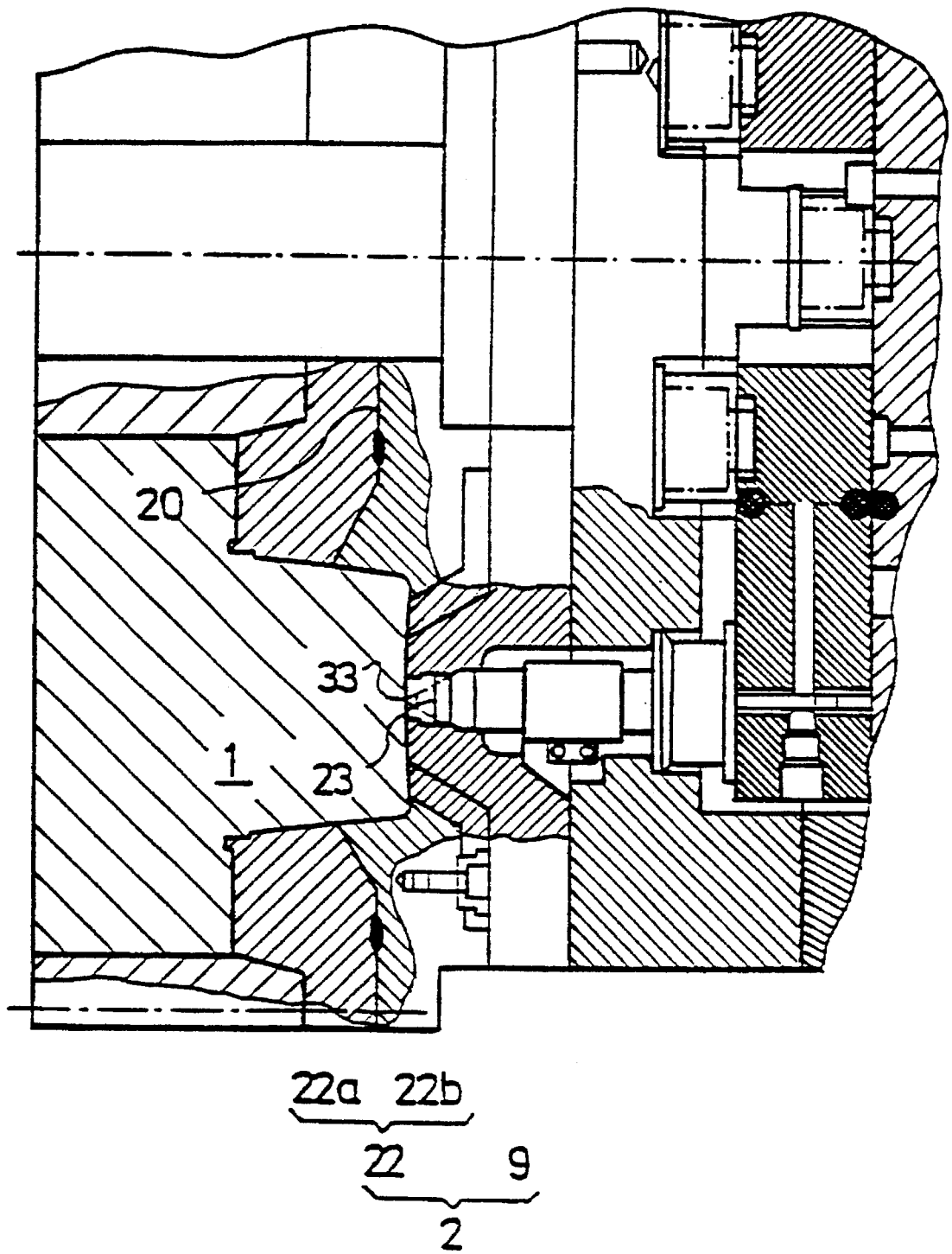

FIG. 6 shows a detailed top view of the injection mould comprising the injection nozzle and adequate supply channels for the molten plastic.

Figure 1:
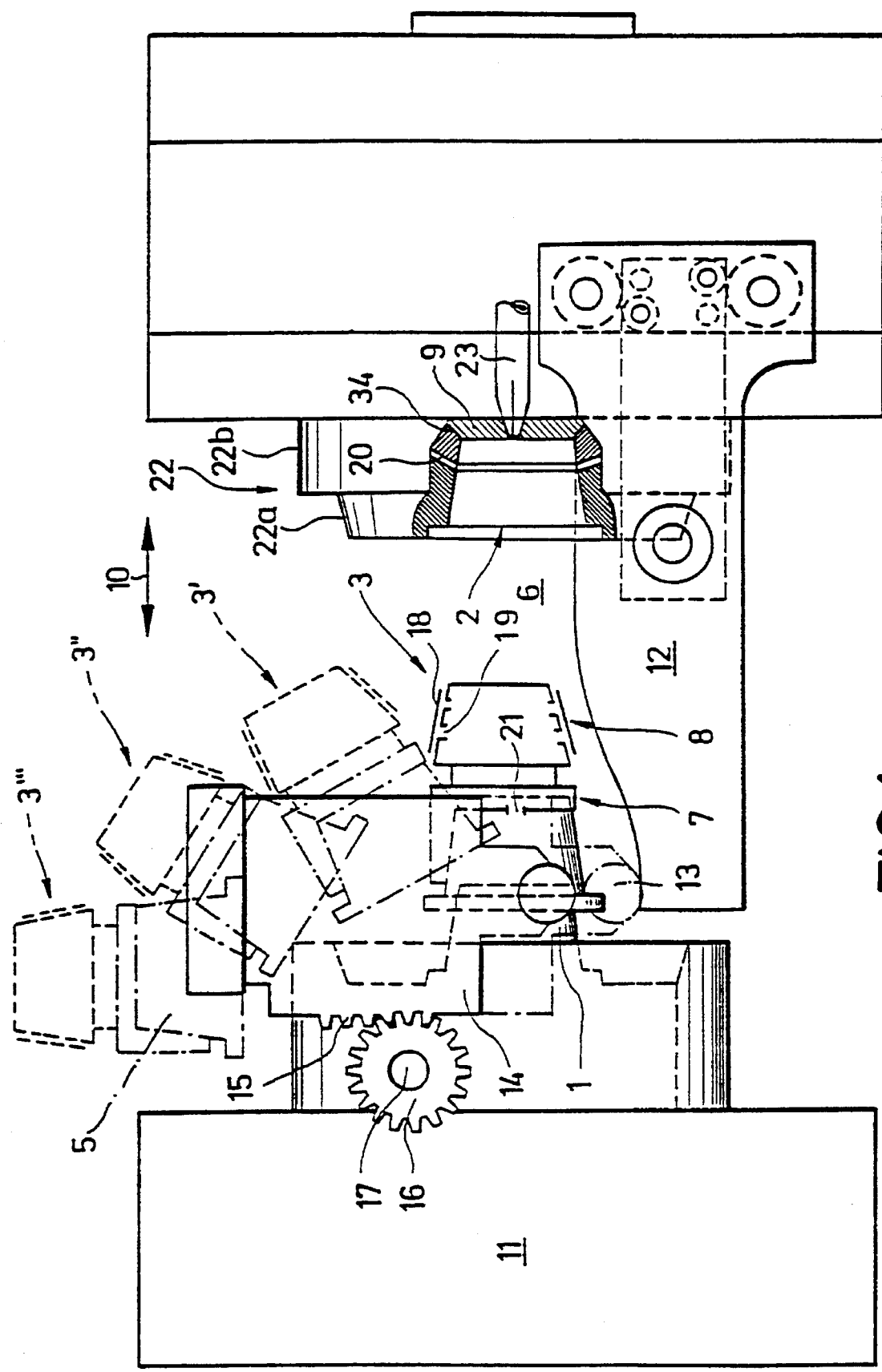

FIG. 1 shows the male mould 1 and the female mould 2, which are adapted to be coaxially inserted into each other and to be moved away from each other. FIG. 1 shows the moved-apart position of the male mould 1 and of the female mould 2, the advancable part 22, which is adapted to be separated from a base member 9 along a separation gap 34, being movable in a direction towards the suction holding mandrel 3, said separation gap 34 being only shown in outlines in FIG. 1 and being more clearly visible in FIG. 2 and 3.

One side of the suction holding mandrel 3 is provided with a removal member 7 for picking up from the male mould 1 a plastic cup 5 which has just been produced. The suction holding mandrel 3 and a plastic cup 5 supported thereby are shown in broken/dot-and-dash lines at various positions 3', 3" and 3'" resulting from the pivotal movement of the pivotable arm 30 into and out of the interspace 6 which gradually evolves and diminishes between the female mould 2 and the male mould 1, said pivotable arm 30 being shown in FIG. 5.

The suction holding mandrel 3 is provided with the removal member 7 used for transporting the plastic cup 5 which has just been produced and with an insertion member 8 used for inserting an enveloping sheet 18 into the female mould 2.

In the embodiment shown in FIG. 1, the whole female mould 2, which essentially comprises the separately advancable part 22 of the female mould 2 and the base member 9 in the form of the bottom of the female mould 2, is adapted to be displaced in the direction of the male mould 1, as indicated by arrow 10. The drive is effected with the aid of drive means, which are not shown, e.g. by means of a controlled electric motor or stepping motor as well as by means of a hydraulic or pneumatic cylinder. In accordance with the present embodiment, the male mould 1 is rigidly secured to a male-mould frame 11, which is a stationary frame.

The whole female mould 2 has connected thereto a cam plate 12, which is adapted to be moved together with the female mould 2 towards and away from the male-mould frame 11. The cam plate 12 cooperates with a travelling wheel 13 which is, in turn, connected to a rack member 14. The teeth 15 of the rack member 14 are in mesh with a pinion 16 which is rotatably supported on a bearing bolt 17. The pinion 16 is connected to the above-mentioned pivotable arm, which is not shown in FIG. 1 and which is, in turn, fixedly connected to the suction holding mandrel 3 at the free end thereof.

Due to the movement of the whole female mould 2 towards and away from the male mould 1, the suction holding mandrel 3 is, by a forced-control pivot movement, moved into and out of the interspace 6, which gradually evolves and diminishes between the female mould 2 and the male mould 1, by means of the cam plate 12, the travelling wheel 13, the rack member 14, the pinion 16 and the positioning arm 30 in the form of the pivotable arm; when the suction holding mandrel 3 occupies the position at which it has fully been pivoted into the interspace 6, its removal member 7 and its insertion member 8 extend coaxially with the male mould 1 and the female mould 2, respectively. The above-mentioned arrangement can be summarized under the concept drive means of the pivotable arm, and said arrangement is also shown in detail in FIG. 5.

When the suction holding mandrel 3 has reached the above-mentioned coaxial position, the advancable part 22 of the female mould 2 is released from the base member 9 of the female mould 2 along the separation gap 34, said advancable part 22 being then moved so as to cover the insertion member 8 of the suction holding mandrel 3. This position is shown in FIG. 4 which will be explained in detail hereinbelow. When the advancable part 22 of the female mould 2 is being moved so as to cover the insertion member 8, the suction holding mandrel 3 remains at the position at which it extends coaxially with the female mould 2 and the male mould 1.

When the advancable part 22 of the female mould 2 has been moved so as to cover an adequate subarea of the insertion member 8 of the suction holding mandrel 3, the enveloping sheet 18, which has hitherto been held in position on the insertion member 8 via vacuum openings 19, is transferred by means of blowing to the female mould 2 where it is received and held in position by means of a vacuum, said vacuum being applied to the suction gap 20 which divides the advancable part 22 of the female mould 2 into two halves 22a and 22b. The suction gap 20 will be explained in detail hereinbelow on the basis of FIG. 2 to 4.

At the same time or even previously, the plastic cup 5, which had just been produced and which had still been attached to the male mould 1, was blown off said male mould 1 in the direction of the removal member 7 of the suction holding mandrel 3, said blowing-off process having the effect that the plastic cup 5 is transported over a small distance to said removal member 7. The removal member 7 is provided with vacuum openings 21, which are positioned opposite the bottom of the cup 5 and by means of which said cup 5 is sucked into contact with the removal member 7 and thus held in position.

After having received the enveloping sheet 18, the advancable part 22 of the female mould 2 returns to its starting position where it joins the base member 9 thus reestablishing the whole female mould 2, which is at the utmost open position at this time, i.e. at the position at which it is located at the largest distance from the male mould 1.

When the advancable part 22 is moved back, the pivotable arm 30 does not carry out any pivotal movement either, and this will have the effect that the advancable part 22 of the female mould 2 is moved away from the suction holding mandrel 3 along a direction which is coaxial with the suction holding mandrel 3 and the male mould 1. When the whole female mould 2 and the male mould 1 are moved towards each other so as to form a closed injection mould, the suction holding mandrel 3 is pivoted out of the interspace 6 existing between the female mould 2 and the male mould 1 and disappearing in the course of this movement.

In the final position 3'" of this pivoting-out movement, the previously finished cup 5 is blown off the removal member 7, whereupon it is transported away e.g. for the purpose of filling or packing.

The final position of the pivoting-out movement of the positioning arm 30 is also combined with the position at which the injection mould is completely closed, i.e. ready for an injection of molten plastic into the female mould 2 by means of the schematically shown injection nozzle 23 through an opening in the base member 9 of the female mould 2. The vacuum used for holding the enveloping sheet 18 in the female mould 2 was previously shut off and the suction gap 20 closed; in the case of the present embodiment, said closing is realized by pressing together the two halves 22a and 22b against the force of a spring. The force used for closing the suction gap 20 is the closing force for the injection mould which presses the whole female mould 2 onto the male mould 1.

During the injection process, a new enveloping sheet 18 supplied by a supply shaft which is not shown is picked up by the insertion member 8 of the suction holding mandrel 3 and held in position by means of vacuum openings 19 connected to a vacuum source.

When the molten plastic has cooled down, the female mould 2 is moved away from the male mould 1, whereby the suction holding mandrel 3 will be pivoted into the interspace 6 which now forms again and the whole sequence of process steps will be carried out again.

When the female mould 2 is moved away from the male mould 1, the plastic cup 5 which has just been produced is held in position by means of a vacuum, which is applied to the surface of the male mould via vacuum openings 29 (cf. FIG. 3 and 4), until, as has already been described hereinbefore, said plastic cup 5 is blown off in the direction of the removal member 7 and transported over a certain distance towards the removal member 7 in the course of this process.

Figure 3:
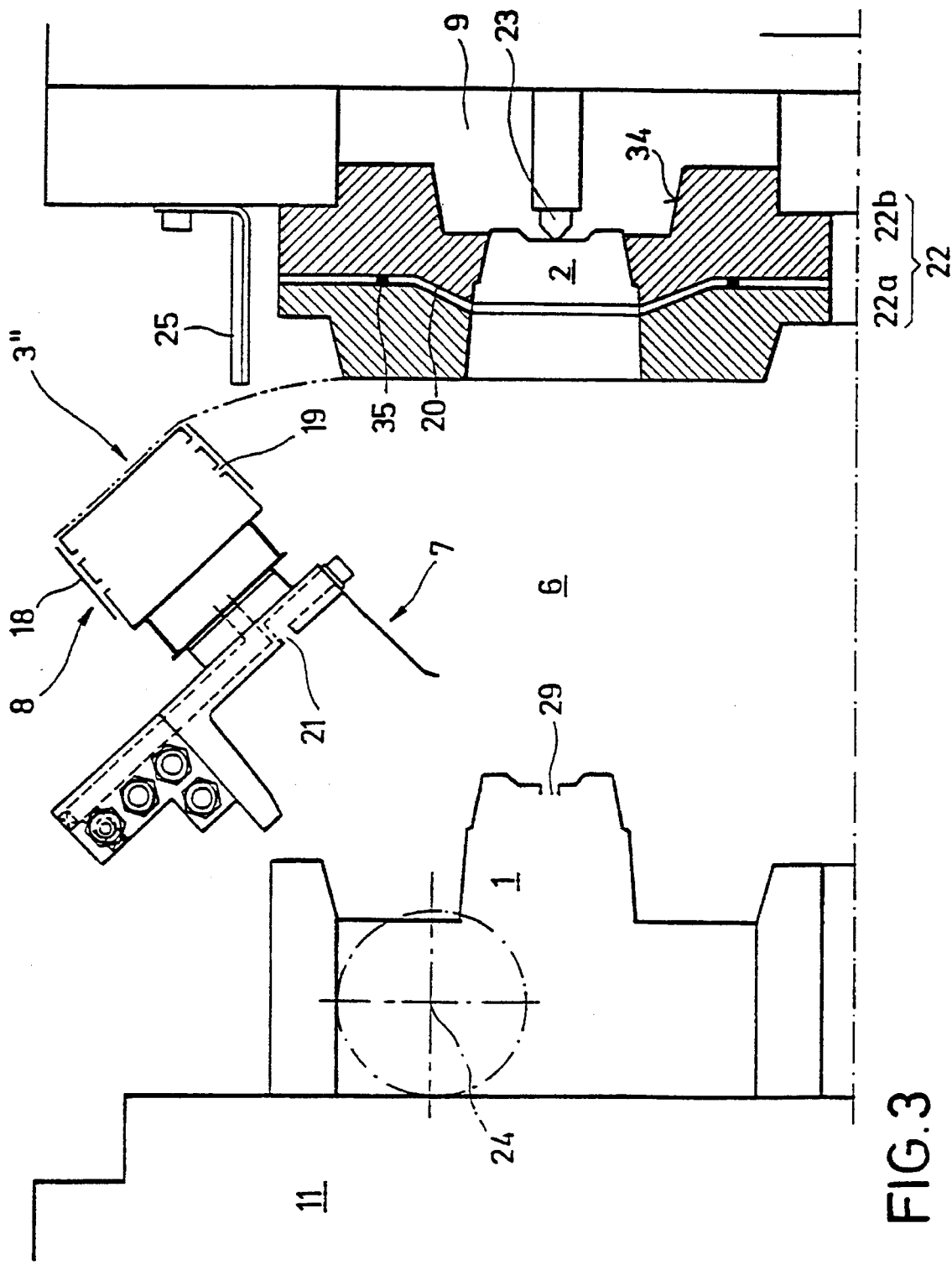
FIG. 3 shows a representation according to FIG. 2 at a position at which the parts of the injection mould have been moved apart half-way and at which the suction holding mandrel has, consequently, been pivoted half-way into the interspace evolving between the female mould and the male mould.

FIG. 2 to 4 show the succession in time of the above-described sequences of movements, FIG. 2 showing the position at which the injection mould is closed completely, FIG. 3 showing the position at which the female mould 2 and the male mould 1 have been moved apart half-way and at which the suction holding mandrel 3 has, consequently, been moved into the evolving interspace 6 half-way, and FIG. 4 showing the position at which the base member 9 of the female mould 2 has been moved away from the male mould 1 to the outermost position and the suction holding mandrel 3 has, consequently, been pivoted fully into the interspace 6 formed between the female mould 2 and the male mould 1, the advancable part 22 of the female mould 2 being moved so as to cover the insertion member 8 of the suction holding mandrel 3 for the purpose of picking up the enveloping sheet 18.

In order to simplify the various representations, the pivotable arm 30 (cf. FIG. 5) is not shown in FIG. 2 to 4 either; said FIG. 2 to 4, however, show the swivel axis 24 about which the pivotable arm 30 is adapted to be pivoted. At the position shown in FIG. 2, the cup 5 is shown a short time before it is blown off against a baffle plate 25 connected to the base member 9. As has already been mentioned, this is the position at which the molten plastic is injected through the base member 9 of the female mould 2 into the gap 26 defined between the female mould 2 and the male mould 1, the gap 26 corresponding to the future cup 5 and constituting the cavity of the injection mould.

At the position shown in FIG. 2, the female mould 2 is pressed against the male mould 1, and this has the effect that the suction gap 20 is closed because, due to the pressure applied, also the halves 22a and 22b of the advancable part 22 are pressed against one another, said advancable part 22 being shown as a hatched component in FIG. 2 to 4.

An O-ring is here provided as spring element 35, said O-ring contributing additionally to a sealing effect, although sufficient sealing is already realized due to the fact that the metal surfaces of the two halves 22a and 22b are pressed against one another whereby the suction gap 20 is closed.

Said FIG. 2 also shows the vacuum opening 21 of the removal member 7, said vacuum opening 21 being used for sucking the bottom of the cup into contact with the removal member 7 and for blowing the cup 5 off the removal member 7.

At the half-open position shown in FIG. 3, the suction holding mandrel 3 starts to pivot into the evolving interspace 6. The cup 5 was previously blown off against the baffle plate 25 by means of compressed air supplied through the vacuum opening 21 and transported away from said baffle plate 25, and the enveloping sheet 18 was previously picked up from a supply shaft and held in position by means of a vacuum supplied via the vacuum openings 19; the blowing off of the finished cup 5 and the picking up of the enveloping sheet 18 for the next injection moulding process took place at the position shown in FIG. 2.

FIG. 4 shows the completely open position of the injection mould at which the advancable part 22 of the female mould 2 has been moved so as to cover the insertion member 8 of the suction holding mandrel 3, the base member 9 of the female mould 2 being located at the largest possible distance from the male mould 1.

At this position, the enveloping sheet 18 is transferred to the female mould 2 by blowing off through the openings 19 of the insertion member 8 which were previously used as vacuum openings 19 for holding the enveloping sheet 18 in position. The female mould 2 holds the enveloping sheet 18 by means of the suction gap 20 which is connected to a vacuum source.

While the advancable part 22 is returning to its starting position where it is recombined with the base member 9 so as to establish the whole female mould 2, the previously produced plastic cup 5 is blown off the male mould 1 by means of the vacuum openings 29 in the direction of the removal member 7 and thus transported to said removal member 7. Since the time at which the male mould 1 and the female mould 2 were moved apart, the plastic cup 5 has been held in position by means of these vacuum openings 29 with the aid of a vacuum.

At the position now reached, the cup 5 is held in position by means of the vacuum opening 21 of the removal member 7 with the aid of a vacuum and the female mould 2 is located at the largest possible distance from the male mould 1 and carries the enveloping sheet 18.

When the female mould 2 and the male mould 1 are now moved towards each other, they will first reach the position shown in FIG. 3 and, finally, the position shown in FIG. 2, whereupon the production cycle for the next cup 5 will be started again.

FIG. 5 shows the pivotable arm 30 as well as the driving unit which is used for said pivotable arm 30 and which comprises the cam plate 12, the travelling wheel 13, the rack member 14 and the pinion 16. By means of said drive unit, the suction holding mandrel 3 is pivoted into and out of the interspace 6 in the manner described hereinbefore.

FIG. 6 shows a more detailed representation of the injection nozzle 23 which is suitable for injecting into the female mould 2 the molten plastic through an opening 33 in the base member 9 constituting the bottom of the female mould. FIG. 6 shows the position at which the female mould 2 has been moved fully into the male mould 1, i.e. at which the injection mould is closed. It is also possible to arrange a plurality of injection moulding devices symmetrically with respect to one another, in a line one behind the other and, additionally, one on top of the other so that a plurality of cups 5 can be produced in a single working cylce.

While this invention has been illustrated and described in accordance with a preferred embodiment, it is recognized that variations and changes may be made therein without departing from the invention as set forth in the claims.

What is claimed is:

1. An injection moulding process for producing a plastic cup having a label-shaped enveloping sheet integrated in said plastic cup according to the inmould-labelling method, said process comprising the following steps:

picking up an enveloping sheet by means of a suction holding mandrel for inserting said enveloping sheet into a female mould for a subsequent injection moulding process;

opening an injection mould by moving the female mould and a male mould away from each other to an opening position, a controlled positioning arm displacing, in the course of this opening movement, the suction holding mandrel to a position where it extends coaxially with the male mould and the female mould in an interspace evolving between the male mould and the female mould when said male and female moulds are moved apart;

removing the previously produced plastic cup from the male mould;

transferring the enveloping sheet from the suction holding mandrel to the female mould and inserting it therein;

coaxially moving the male mould and the female mould into one another until a closed injection mould is re-established, the controlled positioning arm removing, due to said closing movement, the suction holding mandrel from the interspace which is defined between the male mould and the female mould and which disappears as a result of said closing movement;

injecting molten plastic into the closed injection mould, wherein, for inserting the enveloping sheet, at least one part of the female mould is advanced coaxially with the suction holding mandrel from the opening position of said female mould towards said suction holding mandrel, that the enveloping sheet is transferred from the suction holding mandrel to the advanced part of the female mould and inserted therein, and that the advanced part of the female mould is returned to the opening position of said female mould.

2. An injection moulding process according to claim 1, wherein, for picking up the enveloping sheet, the advanced part of the female mould is moved so as to cover at least part of the suction holding mandrel.

3. An injection moulding process according to claim 1, wherein, by blowing the enveloping sheet off the suction holding mandrel, said enveloping sheet is transferred from said suction holding mandrel to the advanced part of the female mould and is picked up and held in position by said female mould by applying a vacuum to the inner surface of the advanced part of said female mould.

4. An injection moulding process according to claim 3, wherein the vacuum acting on the inner surface of the advanced part of the female mould is applied via a suction gap dividing the advanced part of the female mould into two halves and extending essentially transversely to the direction of movement of the advanced part, said two halves being urged apart by the force of a spring for opening said suction gap when the advanced part of the female mould does not have applied thereto any load, whereas, when the injection mould is closed, said two halves are pressed together against said force of a spring by the application of a closing force to the female mould, whereby the suction gap will be closed again.

5. An injection moulding process according to claim 1, wherein the suction holding mandrel is constructed as a combined component and is also used for removing the finished cup, when the suction holding mandrel is located at a position where it extends coaxially with the male mould and the female mould.

6. An injection moulding process according to claim 5, wherein the plastic cup which has just been produced and which is located on the male mould is transferred to the suction holding mandrel, which has been moved to the position at which it extends coaxially with said male mould, by blowing the plastic cup off said male mould towards said suction holding mandrel, and that said plastic cup is picked up by the suction holding mandrel by means of a vacuum applied to a subarea of the surface thereof, said vacuum acting on the bottom of the plastic cup which has just been produced.

7. An injection moulding process according to claim 6, wherein the plastic cup which has just been produced is finally discharged from the suction holding mandrel by blowing off at the position of the positioning arm at which said arm has fully been removed from the interspace between the female mould and the male mould.

8. An injection moulding process according to claim 1, wherein the male mould is always stationary and that the female mould is moved towards and away from said male mould.

9. An injection moulding process according to claim 1, wherein, by means of a forced-control pivotal movement caused by the opening and closing movements, the suction holding mandrel is moved to and removed from the position at which it extends coaxially with the male mould and the female mould.

10. An injection moulding device, comprising a male mould and a female mould which is adapted to be moved coaxially so as to cover the male mould for defining a closed injection mould; an injection nozzle used for injecting molten plastic into the closed injection mould; a positioning arm carrying a suction holding mandrel, said suction holding mandrel being provided with an insertion member which is adapted to insert the enveloping sheet into the female mould, said female mould and said insertion member being each provided with a holding means which is adapted to hold the enveloping sheet in position; a drive means which is adapted to move the male mould and the female mould towards and away from each other; a drive means provided with control means for moving the positioning arm into and out of an interspace by controlled movements, said interspace evolving and disappearing when the female mould and the male mould are moved away from each other and towards each other, respectively, wherein the female mould is adapted to be divided into at least two parts, at least one of said parts being an advancable part which is adapted to be displaced coaxially along a guide means towards the male mould and towards the suction holding mandrel and then back to the opening position of the female mould while the suction holding mandrel remains at the position at which it extends coaxially with the female mould and the male mould.

11. An injection moulding device according to claim 10, wherein the positioning arm is a pivotable arm, which is supported such that it is adapted to be pivoted about a swivel axis at one end thereof and which carries the suction holding mandrel at the other, free end thereof.

12. An injection moulding device according to claim 11, wherein the drive means provided with the control means for the positioning arm is a cam plate, which is entrained when the male mould and the female mould are moved towards and away from each other and which cooperates with a travelling wheel connected to a rack member which is, in turn, in mesh with a pinion, said pinion being, in turn, rigidly connected to the positioning arm and adapted to be rotated together therewith about the swivel axis of said positioning arm.

13. An injection moulding device according to claim 10, wherein the suction holding mandrel is a combined component comprising a removal member, which is adapted to remove a plastic cup which has just been produced, and an insertion member, which is adapted to insert the enveloping sheet into the female mould, said removal member and said insertion member being coaxially secured to each other.

14. An injection moulding device according to claim 13, wherein the holding means for the plastic cup are openings terminating at the surface of the male mould and at the surface of the removal member of the suction holding mandrel, said openings being connected to a vacuum source, 15. An injection moulding device according to claim 10, wherein the male mould is connected to a frame of the injection moulding device in a stationary manner, and that the drive means for moving the female mould and the male mould towards and away from each other is constructed in such a way that the female mould can be moved towards the male mould with the aid of said drive means.

16. An injection moulding device according to claim 10, wherein the advancable part of the female mould is divided into two halves along a suction gap extending essentially transversely to the direction of movement of the female mould, said suction gap having arranged therein a spring element which, when the female mould does not have applied thereto any lead, will urge the two halves of the advancable part away from each other, whereby the suction gap will be opened.

17. An injection moulding device according to claim 16, wherein the spring element is an O-ring accommodated in an adequate annular groove formed in the two halves of the advancable part of the female mould, said annular groove being dimensioned such that there will be room for the O-ring in said annular groove when the injection mould is completely closed and when the two halves are, consequently, fully pressed together.

* * * * *